May 5, 1970     C. E. DRIZA ET AL     3,509,599

TOOL FOR FLARING AND SEVERING SLEEVES FROM PLASTICS TUBING

Original Filed March 17, 1965     2 Sheets-Sheet 1

INVENTORS
CHARLES E. DRIZA
PHILIP R. O'BRIEN

BY George W. Wasson
Ralph L. Freeland Jr.
ATTORNEYS

May 5, 1970   C. E. DRIZA ET AL   3,509,599
TOOL FOR FLARING AND SEVERING SLEEVES FROM PLASTICS TUBING
Original Filed March 17, 1965   2 Sheets-Sheet 2

1ST POSITION

REVOLUTIONS 1 & 2

REVOLUTIONS 3-5

FINAL POSITION

INVENTORS
CHARLES E. DRIZA
PHILIP R. O'BRIEN

BY George W. Wasson
Ralph L. Freeland Jr.
ATTORNEYS

United States Patent Office 3,509,599
Patented May 5, 1970

3,509,599
TOOL FOR FLARING AND SEVERING SLEEVES FROM PLASTICS TUBING
Charles E. Driza, Belleville, and Philip R. O'Brien, Westfield, N.J., assignors to Chevron Research Corporation, San Francisco, Calif., a corporation of Delaware
Original application Mar. 17, 1965, Ser. No. 440,479, now Patent No. 3,410,939. Divided and this application Apr. 5, 1968, Ser. No. 740,004
Int. Cl. B29c *17/00, 27/00*
U.S. Cl. 18—19                                         1 Claim

ABSTRACT OF THE DISCLOSURE

A tool and method for operating the tool is described for severing sleeve sections from an elongated tubular plastics member in a manner to form permanently a flare at each end of the sleeve sections severed from the elongated tube.

---

This application is a division of application Ser. No. 440,479 filed Mar. 17, 1965, now Patent No. 3,410,939.

This invention relates to a new and improved container of the type having a yieldable side wall and sheet metal end closures. More particularly the invention relates to containers having a polypropylene plastics sleeve type body adapted to be closed at each end by sheet metal end closures and to the method of manufacturing containers of that type.

A further object of the present invention is an improved method and apparatus for the formation of the cylindrical sleeve of plastics material that may be adapted with sheet metal end closures at each end to form a container for enclosing materials in a fluid-tight manner.

Another object of the present invention is a method for severing sleeve sections from an elongated tubular member in a manner to form a flare at each end of the severed sleeve sections.

A further object is a method for preforming plastics sleeve sections and sheet metal end closures for the improved container of the present invention so as to adapt each to be joined to the other in a conventional rolled, double seam seal, without forming fractures in the plastics sleeve at the seam or wrinkles in the plastic body of the completed container at the seam between the plastics sleeve and the end closure.

Further objects and features of the invention will be fully apparent to those skilled in the art from the specification and appended drawings illustrating certain preferred embodiments in which.

Figure 2:
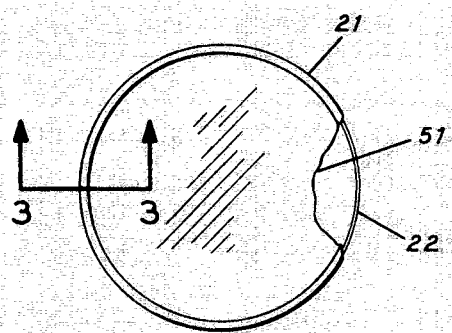
FIGURE 2 is a top plan view, partially in section, of the container constructed in accordance with the present invention.
Figure 1:
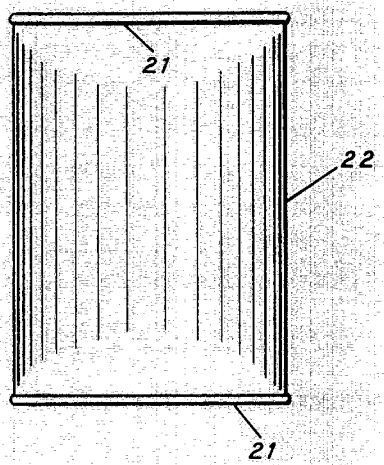
FIGURE 1 is a side elevation of a container constructed in accordance with the present invention.
Figure 3:
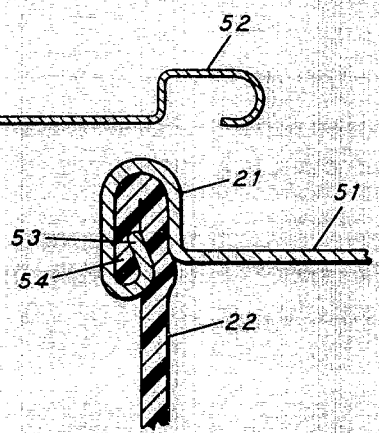
FIGURE 3 is a sectional view taken along the lines 3—3 of FIGURE 2.

The container illustrated in FIG. 1 has all of the appearances of a metal container having metal end closures on each end; however, in accordance with the present invention, the container is formed of a plastics material body portion. The container is intended, however, to serve all of the purposes of the now universally used metal container while at the same time providing the advantages of having yieldable side walls and rigid end closures. As illustrated in FIG. 3, in a section through the double rolled seam of the container, an end closure 21 is shown double seamed with the body portion 22 of the container of FIG. 1. The body portion of the container was formed as a flanged sleeve member of a desired container length and the end closures were then applied to each end of the container.

A preferred plastics material contemplated for the container as illustrated in this application is an extrudable grade of polypropylene. The polypropylene polymer material is initially extruded as a long tube from a suitable extruding device, such as a 2½″ plastics extruder, and is then cut into the desired container lengths and flanged to permit the attachment of the end closures. One of the uses to which the container as illustrated in this application may be put is for canning lubricating motor oils and for that purpose the following formulation of a modified polypropylene material has been found to be successful.

| Material: | Amount |
|---|---|
| 0.4 MFR polypropylene | lbs__ 50 |
| Calcium stearate | grams__ 34 |
| (Dilauryl) (thio di propionate) | do____ 56.8 |
| BHT (Butylated hydroxy toluene) | do____ 22.7 |
| o-158 (not specified by vendor) | do____ 45.5 |
| No. 130 neutral base motor oil | lbs__ 6 |

To the above blend a sufficient powdered pigment may be added to provide the desired color in the extruded material. MFR, as shown in the material column above, is "melt-flow-rate" and is used to characterize polymer materials.

The base powder and the stabilizers of the above materials are initially blended in a Henschel blender for approximately three minutes at a low speed. After the three minute preblending the 130 neutral base motor oil is slowly added to the mix and the blender is switched to a high speed operation for an additional 6–7 minutes of high speed mixing. After the ten minute mix, the mixture is removed from the blender and may be hot melt extruded into pellets to be used as the feedstock when converting the material into tubing. The mixture from the blender also may be used to feed directly to the tube extrusion operation, thereby by-passing the pelletizing operation. The wall thickness referred to in this application is in the range of 0.031 inch to 0.035 inch, but should not be constructed to eliminate the use of thin wall tubing in other than these thicknesses.

Figure 9:
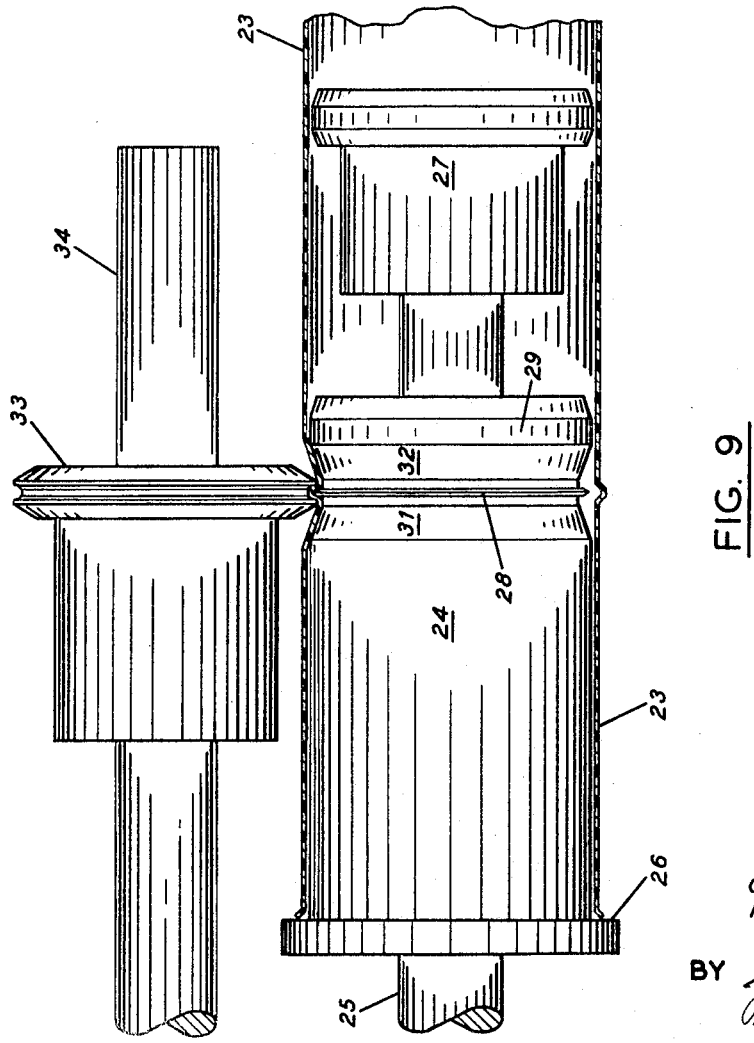
FIGURE 9 is a side elevational view of the apparatus employed to form container sleeve sections and showing the tubular stock of the plastics material in the section.

FIGURES 9–13 illustrate the formation of container sleeve sections from the extruded tubing. As illustrated in FIGURE 9, the tubing 23 is positioned on a sleeve cutting tool where sections of a suitable length for the container that is to be formed are cut. The tubing 23 is supported on a flanging arbor 24 mounted on a rotatable shaft 25 and is forced against a shoulder 26 operating as a step for the positioning of the tubular material on the arbor. The shaft supporting the arbor 24 extends through the arbor and carries an outboard support 27 to provide additional support for the tube 23. At an established position along the arbor, a cutter blade 28 is mounted by suitable means onto the arbor 24 so as to be rotatable with the arbor 24. Between the body portion of the arbor and an end support 29, the diameter of the arbor and the end support are suitably reduced as at 31 and 32 to provide a flanging area long the arbor. The diameter of the cutter blade is substantially the same as the diameter of the arbor 24.

A flare forming wheel 33 is adapted to cooperate with the cutter blade 28 to sever and flare the sleeve sections from the tubing 23. The wheel 33 is mounted on a rotatable shaft 34 positioned to be parallel to the rotatable shaft 25 supporting the arbor 24. The shafts 25 and 34 are movable laterally relative to each other so that the flare forming wheel may be moved to cooperate with the cutter blade to accomplish the flaring of the tubular material 23 to form it into the flexible side wall of the sleeve member 22 as illustrated in FIGURE 3. The flare forming wheel is suitably attached to the shaft 34 so as to be rotated by its shaft while the arbor 24 is rotated to rotate the tube 23. Shafts 25 and 34 have identical rotational speeds.

Figure 10:
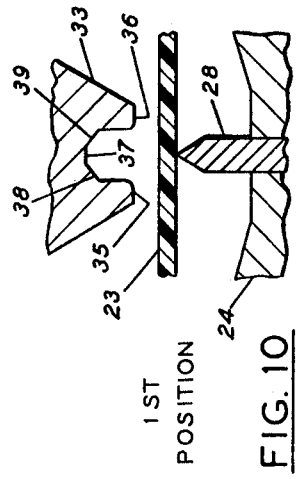
FIGURES 10, 11, 12 and 13 are enlarged sectional views showing the steps in the formation of the flange on the plastics sleeve section and the severing of the sleeve sections from the tubular plastics stock.
Figure 11:
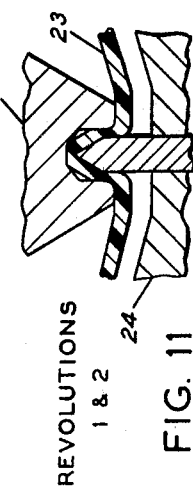

As illustrated in FIGURES 10–13 the flaring and severing operation is accomplished in a number of revolutions of the two shafts 25 and 34. FIGURE 10 illustrates a first position with the sleeve 23 positioned between the flare forming wheel 33 and the cutter blade 28. The flare forming wheel 33 is provided with shoulders at 35 and 36 spaced from each other to form a valley 37 therebetween. The base of the valley is substantially parallel to the axis of the shaft 34 on which the flare forming wheel is mounted. Between the flat surfaces and the inner edges of the shoulders 35 and 36, the valley of the wheel is chamfered to provide working surfaces at 38 and 39 to be described hereinafter. FIGURE 11 illustrates the position of the sleeve material 23 between the cutter blade 28 of the arbor 24 and the flare forming wheel 33 as the shafts 25 and 34 are moved laterally toward each other. The first few revolutions of these two shafts (at least two revolutions) applies a pressure against the sleeve material to cause it to be initially pressed and formed into the valley of the flare forming wheel. From this operation the polypropylene tubing material of the present invention takes an initial set without causing fractures along the sharp bends of the sleeve material. It should be noted that the inner edges of the shoulders 35 and 36 are rounded to prevent sharp cracking of the sleeve material.

Figure 12:
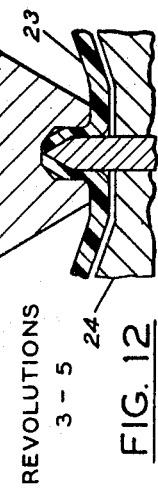

As illustrated in FIGURE 12, the next few revolutions of the two shafts 25 and 34 are accomplished with additional lateral movement of the two shafts toward each other. As the shafts are moved toward each other, the cutting surface of the cutter blade 28 is brought into contact with the flat bottom of the valley 37 to cause the tube 23 to be cut into a sleeve portion. Several revolutions of the two shafts are accomplished in this position to insure the cutting of the tube into the sleeve sections.

Figure 13:
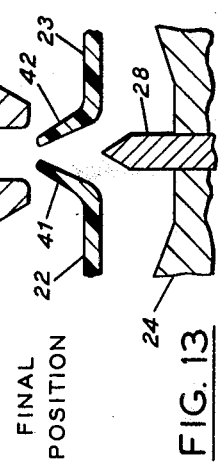

As illustrated in FIGURE 13, the two shafts 25 and 34 are then separated from each other and the sleeve portion 22 is removed from the arbor and another severing operation is performed. It should be noted in FIGURE 13 that the sleeve 22 has been severed from the tube 23 and that the end of the sleeve 22 has been formed into a flange 41 having a permanent set outwardly from the axis of the tube. It should also be noted that the leading edge of the next sleeve 23 has been formed into a flange at 42 so that as the next sleeve member is severed from the tube, it will have one end flange already formed. After a sleeve member is formed the two shafts 25 and 34 will be moved away from each other, the sleeve removed, and then the tubing repositioned for the formation of the next sleeve.

While the foregoing severing operation has been described as employing a single cutter blade and cooperating flare forming wheel, it should be understood that the shaft 25 may accommodate a number of arbors 24 and that the shaft 34 may also accommodate a number of flare forming wheels in alignment with each of the cutter blades on the shaft 25. With the multiple blade and flare forming wheel tool, a plurality of sleeves may be severed from the tube 23 with each of the multiple revolution operations of the shafts 25 and 34. When the sleeves are completely severed from the tube and the flare forming wheel and cutter blade have been moved away from each other, the sleeves may be extracted from the arbor and a new tube may be positioned on the arbor to be formed into the next group of sleeve members.

Figure 4:
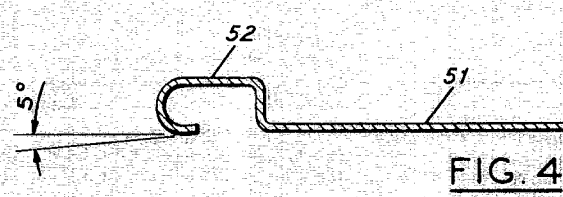
FIGURE 4 is an enlarged sectional view showing the formation of the end closure prior to its use in a seaming engagement with the sleeve sections of the present container.

Referring now to FIGURES 1–8, the process for attaching an end closure with a double seam will now be described. FIGURE 4 illustrates a section through an end closure blank. It should be understood that the end closure is in reality a disk-like member having a central flat portion 51 and preformed end curls 52. The preformed curls of the end closure are adapted to form the cover hook that will eventually be rolled during double seamed connection of the end closure to the body hook of the sleeve portion of the container. FIGURE 3 illustrates the cover hook at 53, the body hook at 54, the sleeve at 22 and the end closure at 51.

Figure 5:
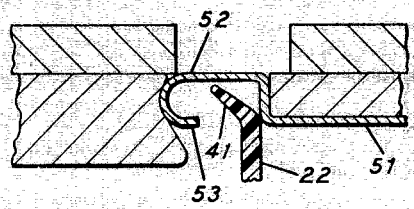
FIGURES 5, 6, 7 and 8 are enlarged sectional views showing the steps employed in seaming the end closures onto the sidewalls.
Figure 6:
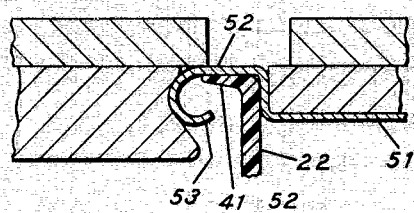

FIGURES 5–8 illustrate the formation of the double seamed engagement of the end closure with the sleeve body portion. As illustrated in FIGURE 5, the flanged end 41 of a container sleeve 22 is inserted into the precurled end 52 of the end closure 51. It should be noted that the precurled portion 52 is provided with a slight overcurl of from 0° to 5° with respect to the flat end surface and the overall thickness of the end closure is from 0.060 inch to 0.062 inch as illustrated in FIGURE 4 and that the flanged end of the sleeve is inserted under the precurled lip, as is the case with existing practice. FIGURE 6 illustrates the initial positioning of the sleeve member 22 against the inside surface of the precurled portion 52 of the end closure 51; the sleeve is then pressed against the inside surface of the end closure with the flange 41 extending flat against that inside surface. Also in FIGURE 6 it can be seen that the cover hook 53 is started in its curl into engagement with the exterior of the sleeve where the flange 41 has been formed. In each of the FIGURES 5–8 the forming surfaces of the tool for engaging the end closure onto the sleeve are shown as they engage the end closure to effect the double seamed formation. Each of these tools is shown in section and it should be understood that they are progressive forming dies, each rotatable about an axis aligned with respect to the axis of the sleeve having the end closure attached thereto.

Figure 7:
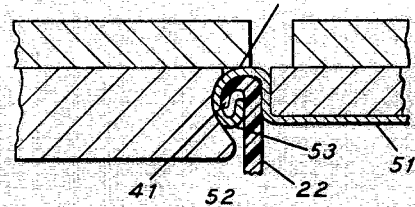

FIGURE 7 illustrates the formation of the double seamed end closure with the flanged end 41 of the sleeve 22 totally enclosed by the now double curled end 52 of the end closure 51. It can be seen that the cover hook 53 is worked by its forming die and that the flange 41 has now been substantially formed into the body hook of the double seamed end closure.

Figure 8:
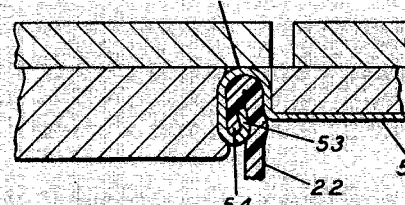

FIGURE 8 illustrates the final formation of the double seamed end closure with the cover hook 53 enclosing the body hook 54 and with the end closure 51 totally enclosing the flanged end of the sleeve 22. The formed double seamed seal is then compressed laterally with respect to the axis of the sleeve so as to form the tight seal as illustrated in FIGURE 3. The entire double seamed seal has been formed merely by rolling the end closure and sleeve body into each other and no sealing compound or material has been employed due to the compressibility of the plastics.

The container of the present invention is now provided with an end closure at at least one end thereof. If the end closure as applied is considered to be the bottom of the container, the container may then be filled and a cover closure may be applied in exactly the same manner as has been illustrated in FIGURES 5–8. The particular container illustrated has been formed of a modified polypropylene plastics sleeve material and the end closure has been applied to the sleeve material on a conventional cover applying machine as used in the canning industry. The plastics body portion and end closure are sealed in a double seal formed without wrinkles at the juncture of the container body and the cover hook. It also has been found that where flexible side wall containers have failed and developed punctures, these failures and punctures generally occur where wrinkles have been formed in the application of the end closures. The preforming of the end closure with the slight inwardly bent angle as shown in FIGURE 4, has been instrumental in the elimination of the wrinkling of the flexible material against the end closure. It has also been found that the use of polypropylene for the sleeve material produces an advantage over many other plastics materials in that it may be formed with the flange as at 41 without causing stress failures at the body wall where the inside of the seaming wall radius is formed. Other plastics materials have been found to form stress cracks at these flanges; those materials fail to function satisfactorily particularly where the containers may be subjected to increased internal pressures as may occur if the container is dropped.

One specific use of a container formed in the manner illustrated and of the material previously described, is for dispensing canned lubricating oils of the type used in automobiles. The modified polypropylene material including a predetermined amount of neutral motor oil blended into the mixture is the feedstock to the tube extruder. The tubes are then flanged and cut into the sleeve type body portion that may be seamed at each end to enclose the graded motor oils. The polypropylene material used as the sleeve portion of the container for motor oils is modified with the blended neutral oil to eliminate the adsorption of the motor oil into the container body. Polypropylene and other plastics polymers have a tendency to absorb the contained oils if used as containers for motor oils. When modified as herein proposed this adsorption is eliminated while retaining all of the desirable features of the polypropylene itself. The flexible walled container thus formed provides a container that will withstand the usual amount of rough treatment encountered in service stations while providing adequate strength for stacking in the storage before use. The manufacture of these containers is greatly simplified by the formation of the sleeves from the extruded tubular material and the application of end closures in the conventional double seamed manner. The formation of the body portion of these containers from a plastics material also reduces the overall cost of the container in the dispensing of canned goods in that plastics materials are considerably less expensive than both the all metal containers and the foil covered fiber containers presently in use.

While a certain preferred embodiment of the invention has been specifically disclosed, it should be understood that the invention is not limited thereto as many variations will be readily apparent to those skilled in the art and the invention is to be given its broadest possible interpretation within the terms of the following claims:

We claim:
1. A tool for forming a flare at the end of two polypropylene plastics sleeves while severing said sleeves from each other comprising:
  (a) a flare forming wheel having a central axis for rotation, a first surface having a peripheral radial dimension from said axis of said wheel, shoulder surface at each side of said first surface having larger radial dimension from said axis of said wheel than the dimension of said first surface, said shoulders being spaced from each other in a direction parallel to the axis of said wheel, the surface of said wheel between said first surface and each of said shoulders being rounded at the larger radial dimension in joining said shoulder and chamfered at 40° at the smaller radial dimension in joining said first surface,
  (b) and a flanging arbor and slitter having a central axis for rotation parallel to said axis for rotation of said forming wheel, a first surface having a peripheral radial dimension from said axis of said arbor and aligned with the longitudinal center of said first surface of said forming wheel, second surfaces at each side of said first surface having smaller radial dimensions from said axis of said arbor than the dimension of said first surface, said first surface having a cutting edge at its largest radial dimension and having a body portion of a width parallel to the axis of said arbor smaller than said space between shoulders on said forming wheel by an amount adequate to accommodate at least one layer of said polypropylene material at each side of said body portion,
  (c) said flanging arbor and slitter and said flare forming wheel being movable with respect to each other so as to position said body portion of said first surface of said arbor between said shoulders of said wheel and said second surface of said arbor aligned with said shoulder surfaces of said wheel, said cutting edge of said arbor being adapted to substantially contact said first surface of said wheel, whereby the ends of two polypropylene plastics sleeves are formed with a flared end edge and severed from each other as said wheel and arbor are rotated with respect to each other.

References Cited

UNITED STATES PATENTS 2,811,745 11/1957 Dowse et al. _____ 18—10 XR
3,060,503 10/1962 Eckert _____ 18—10 XR
3,187,380 6/1965 Harrison _____ 18—10 XR WILLIAM J. STEPHENSON, Primary Examiner